United States Patent
Lai et al.

(10) Patent No.: US 10,629,155 B2
(45) Date of Patent: Apr. 21, 2020

(54) METHOD FOR DRIVING DISPLAY PANEL, DISPLAY PANEL, AND DISPLAY DEVICE

(71) Applicant: Xiamen Tianma Micro-Electronics Co., Ltd., Xiamen (CN)

(72) Inventors: Qingjun Lai, Xiamen (CN); Yihua Zhu, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/824,069

(22) Filed: Nov. 28, 2017

(65) Prior Publication Data

US 2018/0366083 A1    Dec. 20, 2018

(30) Foreign Application Priority Data

Jun. 14, 2017  (CN) .......................... 2017 1 0448581

(51) Int. Cl.
```
G09G 3/36      (2006.01)
G06F 3/041     (2006.01)
G02F 1/1343    (2006.01)
G02F 1/1333    (2006.01)
G06F 3/044     (2006.01)
```

(52) U.S. Cl.
CPC ....... *G09G 3/3696* (2013.01); *G02F 1/13338* (2013.01); *G02F 1/134336* (2013.01); *G06F 3/0412* (2013.01); *G06F 3/0416* (2013.01); *G09G 3/3648* (2013.01); *G06F 3/044* (2013.01);

(Continued)

(58) Field of Classification Search
CPC combination set(s) only.
See application file for complete search history.

(56) References Cited

U.S. PATENT DOCUMENTS

| | | | |
|---|---|---|---|
| 2007/0176905 A1* | 8/2007 | Shih | G02F 1/13338 345/173 |
| 2012/0182518 A1* | 7/2012 | Ho | G09G 3/3233 349/192 |
| 2018/0182342 A1* | 6/2018 | Li | G09G 3/3648 |

FOREIGN PATENT DOCUMENTS

| CN | 102708820 B | 8/2014 |
|---|---|---|
| CN | 104777942 A | 7/2015 |

(Continued)

OTHER PUBLICATIONS

CN 106205521 Dec. 2016 Li Man (Year: 2016).*

(Continued)

*Primary Examiner* — Van N Chow
(74) *Attorney, Agent, or Firm* — Tarolli, Sundheim, Covell & Tummino LLP (57) ABSTRACT

The present disclosure provides a method for driving a display panel, a display panel, and a display device, which relates to the technical field of liquid crystal display technologies, and can decrease a risk of abnormal display caused by a sudden change of voltage on a touch electrode, when finishing a touch stage and entering into a display stage. The method includes: when finishing a touch stage and entering into a display stage, compensating a charging voltage value corresponding to first N rows of to-be-charged pixel electrodes in the display stage; and charging the first N rows of the to-be-charged pixel electrodes according to a charging voltage value after compensation; wherein N is an integer greater than or equal to 1. The technical solution is mainly used in a charging process of the pixel electrodes.

12 Claims, 7 Drawing Sheets when finishing a touch stage and entering into a display stage, compensating a charging voltage value corresponding to first N rows of to-be-charged pixel electrodes in the display stage — 101 charging the first N rows of to-be-charged pixel electrodes according to a charging voltage value after being compensated — 102

(52) U.S. Cl.
CPC ... *G09G 3/3655* (2013.01); *G09G 2310/0251* (2013.01); *G09G 2310/08* (2013.01)

(56) References Cited

FOREIGN PATENT DOCUMENTS

| CN | 105895021 A | 8/2016 |
|---|---|---|
| CN | 106601173 A | 4/2017 |

OTHER PUBLICATIONS

Sequential controller, pixel driving method and touch control display apparatus (English machine translation) Geng Weibiao Publication Date: Apr. 26, 2017 (Year: 2017).*

Chinese OA dated Jun. 28, 2019 for corresponding CN Application No. 201710448581.9.

\* cited by examiner

FIG. 4 according to a difference between the charging voltage value of the previous row of pixel electrodes and a predetermined charging voltage value of the present row of to-be-charged pixel electrodes, obtaining a compensated charging voltage value corresponding to the present row of to-be-charged pixel electrodes —2011 charging the present row of to-be-charged pixel electrodes according to the compensated charging voltage value —2021

FIG. 5 acquiring a charging voltage value V1 corresponding to the previous row of pixel electrodes, acquiring a pre-determined charging voltage value V2 corresponding to the present row of to-be-charged pixel electrodes, obtaining a compensated charging voltage value V3 corresponding to the present row of to-be-charged pixel electrodes, and V3=V2+(V2-V1)×k —2012 charging the present row of to-be-charged pixel electrodes according to the compensated charging voltage value V3 —2022

METHOD FOR DRIVING DISPLAY PANEL, DISPLAY PANEL, AND DISPLAY DEVICE

CROSS-REFERENCE TO RELATED APPLICATIONS

The present application claims the benefit of priority to Chinese Patent Application No. 201710448581.9, filed on Jun. 14, 2017, the content of which is incorporated herein by reference in its entirety.

TECHNICAL FIELD

The present disclosure relates to the field of liquid crystal display technologies and, more particularly, to a method for driving a display panel, a display device, and a display device.

BACKGROUND

Currently, a touch display device includes a plurality of touch electrodes placed in matrix. A working process of the display device includes a touch stage and a display stage, and the touch stage and the display stage are performed alternatively. For example, at the display stage, first scanning from a first row to an $n^{th}$ row, in the scanning process, the first row to the $n^{th}$ row of pixel electrodes are charged successively. While at the display stage, a voltage signal of a common electrode is provided to the touch electrode; then entering into the touch stage, at the touch stage, a touch signal is provided to the touch electrode; after finishing a previous touch stage, entering into a next display stage, then continually scanning from an $(n+1)^{th}$ row to an $m^{th}$ row, in the scanning process, the $(n+1)^{th}$ row to the $m^{th}$ row of pixel electrodes are charged successively, while at the display stage, a voltage signal of a common electrode is provided to the touch electrode; then entering into a next touch stage, and so on. In a process of scanning the pixel electrodes row by row, multiple touch stages are inserted to achieve a touch function.

However, after finishing the touch stage and when entering into the display stage, a change of the voltage signal on the data line may impact the touch electrode, and make a voltage of the touch electrode change. At this time, corresponding liquid crystal cannot deflect to a predetermined angle, which results in abnormal display of a display frame, for example, abnormal horizontal lines may appear.

SUMMARY

Embodiments of the present disclosure provide a method for driving a display panel, a display panel, and a display device, which can decrease a risk of abnormal display caused by a sudden change of voltage on a touch electrode, when finishing a touch stage and entering into a display stage.

In a first aspect, embodiments of the present disclosure provide a method for driving a display panel, the method being performed in a touch stage and a display stage, and including steps of: when finishing the touch stage and entering into the display stage, compensating a charging voltage value respectively corresponding to first N rows of to-be-charged pixel electrodes in the display stage; and charging each row of the first N rows of to-be-charged pixel electrodes according to a corresponding charging voltage value after compensation; wherein N is an integer greater than or equal to 1.

In a second aspect, embodiments of the present disclosure further provide a display panel, including: a drive unit, wherein the drive unit includes: a compensation module, configured to, when a touch stage is finished and a display stage is entered, compensate N charging voltage values respectively corresponding to first N rows of to-be-charged pixel electrodes in the display stage, N is an integer greater than or equal to 1; and a drive module, configured to charge each row of the first N rows of to-be-charged pixel electrodes according to a corresponding charging voltage value after compensation and drive the display panel to display.

In a third aspect, embodiments of the present disclosure further provide a display device including a display panel, wherein the display panel includes: a drive unit, wherein the drive unit includes: a compensation module, configured to, when a touch stage is finished and a display stage is entered, compensate N charging voltage values respectively corresponding to first N rows of to-be-charged pixel electrodes in the display stage, N is an integer greater than or equal to 1; and a drive module, configured to charge each row of the first N rows of to-be-charged pixel electrodes according to a corresponding charging voltage value after compensation and drive the display panel to display.

In the display panel of embodiments of the present disclosure, after finishing the touch stage and entering into the display stage, the charging voltage value corresponding to the first N rows of to-be-charged pixel electrodes at the display stage is compensated, the first N rows of to-be-charged pixel electrodes are charged according to the charging voltage value after compensation, the voltage value difference between the charging voltage value after compensation and the voltage value of the touch electrode after sudden change is still close to the target voltage difference. Therefore, a corresponding liquid crystal can deflect close to a predetermined angle, an adverse influence of the sudden change of the voltage value of the touch electrode on charging can be offset in a certain extent, and a risk of abnormal display caused by a sudden change of voltage on a touch electrode, when finishing a touch stage and entering into a display stage, is decreased.

BRIEF DESCRIPTION OF DRAWINGS

In order to more clearly illustrate technical solutions of embodiments of the present disclosure or of the related art, the accompanying drawings used in the embodiments or the related art will be briefly described below. Apparently, the accompanying drawings in the following description are for some embodiments of the present disclosure, for those of ordinary skill in the art, other accompanying drawings can also be obtained according to these accompanying drawings without creative efforts.

DESCRIPTION OF EMBODIMENTS

In order to better understand the purpose, technical solutions, and advantages of the present disclosure, technical solutions of embodiments of the present disclosure are clearly and completely described as below with reference to the accompanying drawings. Apparently, described embodiments are a part of the embodiments of the present disclosure, rather than all of the embodiments. Based on the embodiments in the present disclosure, all other embodiments obtained by those of ordinary skill in the art without creative efforts shall belong to the protection scope of the present disclosure.

The terms used in embodiments of the present disclosure are only for the purpose of describing specific embodiments, and are not intended to limit the present disclosure. "a", "an", "the" and "said" in the singular form used in the embodiments of the present disclosure and appended claims are also intended to including the plural form, unless clearly noted in the context.

Figure 1:
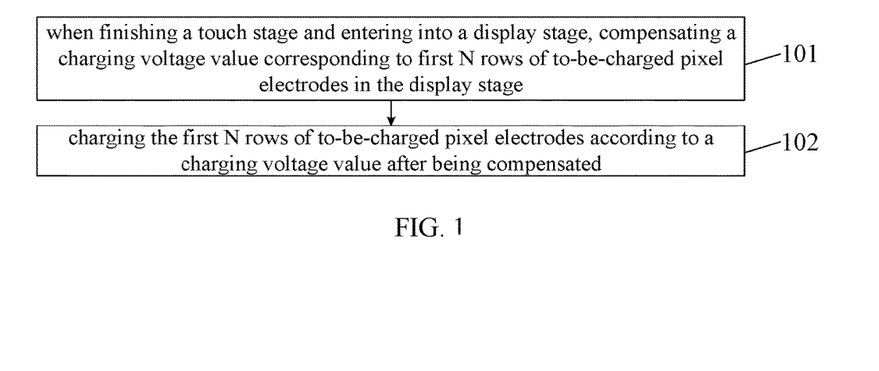
FIG. 1 illustrates a schematic flow diagram of a method for driving a display panel according to an embodiment of the present disclosure.

As shown in FIG. 1, which illustrates a schematic flow diagram of a method for driving a display panel according to an embodiment of the present disclosure, the present disclosure provides a method for driving a display panel. The method for driving a display panel includes:

Step 101: when finishing a touch stage and entering into a display stage, compensating a charging voltage value corresponding to first N rows of to-be-charged pixel electrodes in the display stage; and Step 102: charging the first N rows of to-be-charged pixel electrodes according to a charging voltage value after being compensated, wherein N is an integer greater than or equal to 1.

Figure 2:
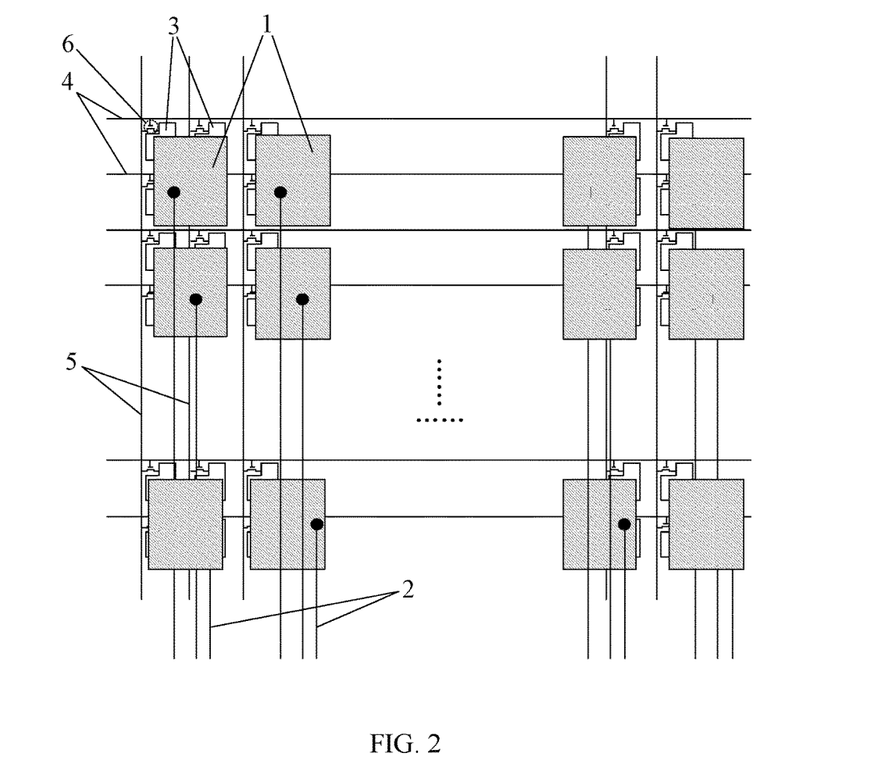
FIG. 2 illustrates a structural schematic diagram of a display panel according to an embodiment of the present disclosure.
Figure 3:
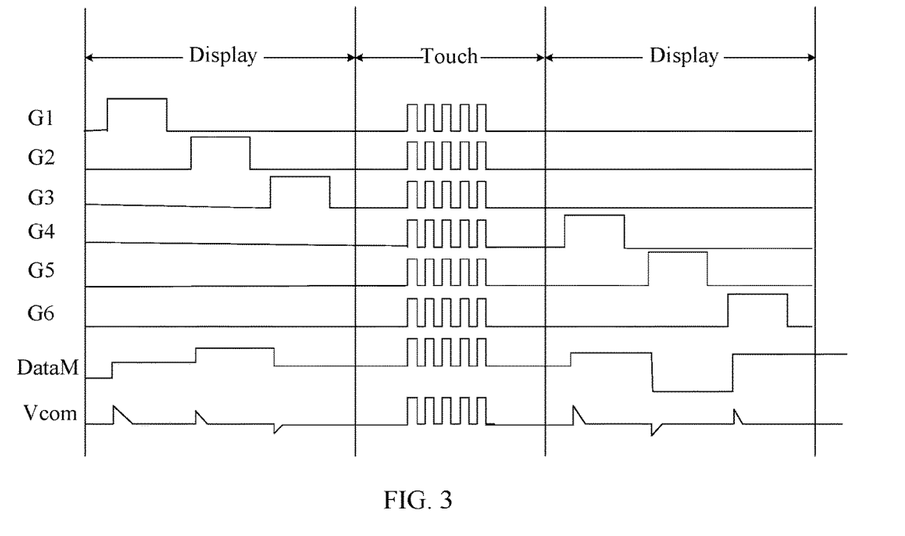
FIG. 3 illustrates a sequence diagram of the display panel of FIG. 2.

FIG. 2 illustrates a structural schematic diagram of a display panel according to an embodiment of the present disclosure, FIG. 3 illustrates a sequence diagram of the display panel of FIG. 2, as shown in FIGS. 2 and 3, the display panel includes a plurality of touch electrodes 1 placed in matrix, a plurality of touch signal lines 2, a plurality of pixel electrodes 3 placed in matrix, a plurality of gate lines 4, a plurality of data lines 5, and a plurality of thin film transistors 6. Each touch electrode 1 is electrically connected with at least one touch signal line 2. At a touch stage, the touch electrode 1 receives a touch pulse signal, and at the display stage, the touch electrode 1 receives a common electrode voltage. The pixel electrodes 3 are placed at a different layer from the touch electrodes 1, and are insulated from the touch electrodes 1. More than one of the pixel electrodes 3 corresponds to one touch electrode 1. Each gate line 4 corresponds to one row of the pixel electrodes 3, and each data line 5 corresponds to one column of the pixel electrodes 3. Each thin film transistor 6 corresponds to one pixel electrode 3, a source electrode of the thin film transistor 6 is electrically connected with a corresponding data line 5, a drain electrode of the thin film transistor 6 is electrically connected with a corresponding pixel electrode 5, and a gate electrode of the thin film transistor 6 is electrically connected with a corresponding gate line 4. In FIG. 3, a sequence diagram of the display panel of FIG. 1, G1, G2, G3 . . . G6 respectively refer to signals on the gate lines 4 corresponding to a first row to a sixth row of the pixel electrodes 3. A high level is a turn-on level, and a low level is a turn-off level. When the gate line 4 is at a high level, the thin film transistor 6 corresponding to the gate line 4 is turned-on, a voltage of the data line 5 corresponding to the thin film transistor 6 is transmitted to the corresponding pixel electrode 3, so as to charge the corresponding pixel electrode 3. DataM refers to a voltage signal of the data line 5 corresponding to an $M^{th}$ column of pixel electrodes 3, and Vcom refers to a voltage of the touch electrode 1.

The drive method of the present embodiment is illustrated in details by a working process of the display panel. In a first display stage Display as shown in FIG. 3, a first row, a second row, and a third row of the pixel electrodes 3 are charged successively; after finishing the display stage, entering into the touch stage Touch, at this moment, the touch electrode 1 receives the touch pulse signal to perform the touch function. For reducing influence of other signals on the touch pulse signal, at the touch stage, controllable signals are all set as the same signals as the touch pulse signal, and uncontrollable signals affected by the touch pulse signal also show similar waveform to the touch pulse signal. After finishing the touch stage, entering into a second display stage, a fourth row, a fifth row, and a sixth row of the pixel electrodes 3 are charged successively; in a scanning process of a previous few rows of the pixel electrodes 3 after starting the second display stage, the touch electrode 1 is greatly disturbed, a sudden change of the voltage value of the touch electrode 1 is obvious, thus, for offsetting the influence of the sudden change of the voltage value of the touch electrode 1, in the present embodiment, a charging voltage value corresponding to the first N rows of to-be-charged pixel electrodes 3 is compensated, that is to say, the corresponding pixel electrodes 3 are charged after a predetermined charging voltage value is compensated, which makes the pixel electrodes 3 still be charged to the predetermined charging voltage value under a disturbance of the sudden change of the voltage value of the touch electrode 1. For example, in the related art, a charging voltage of a third row of the pixel electrodes is 0V, a predetermined charging voltage value of a fourth row of the pixel electrodes is 4V, theoretically, a target voltage difference between the pixel electrode and the touch electrode is 4V, when the fourth row of the pixel electrodes is started to be charged, a voltage of the touch electrode is increased to 0.5V, and an actual voltage difference between the pixel electrode after charged and the touch electrode is 3.5V, i.e., smaller than the target voltage difference 4V, which results in that a corresponding liquid crystal cannot deflect to a predetermined angle. However, in embodiments of the present disclosure, when the fourth row of the pixel electrodes 3 is charged, the charging voltage value after compensation is higher than the predetermined charging voltage value, even though the voltage of the touch electrode 1 is increased to 0.5V, a voltage difference between an actual charging voltage value and the touch electrode is still 4V, that is to say, the voltage difference is still close to the target voltage difference. Thus, a corresponding liquid crystal can deflect to an angle close to a predetermined angle.

In the method for driving a display panel of embodiments of the present disclosure, after finishing the touch stage and entering into the display stage, the charging voltage value corresponding to the first N rows of to-be-charged pixel electrodes at the display stage is compensated, the first N rows of to-be-charged pixel electrodes are charged according to the charging voltage value after compensation, the voltage value difference between the charging voltage value after compensation and the voltage value of the touch electrode after sudden change is still close to the target voltage difference. Therefore, a corresponding liquid crystal can deflect close to a predetermined angle, an adverse influence of the sudden change of the voltage value of the touch electrode on charging can be offset in a certain degree, and a risk of abnormal display caused by a sudden change of voltage on a touch electrode, when finishing a touch stage and entering into a display stage, is decreased.

Figure 4:
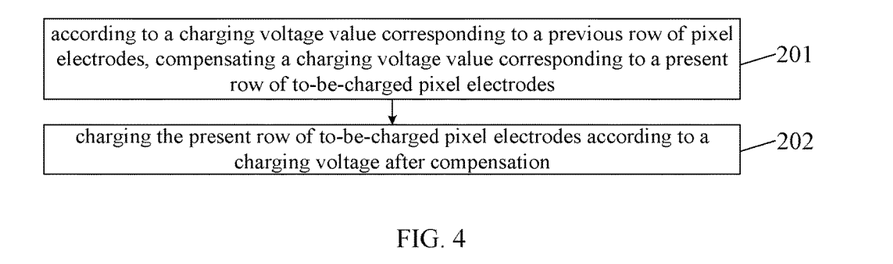
FIG. 4 illustrates a schematic flow diagram of a process of charging each row of to-be-charged pixel electrodes when charging N rows of to-be-charged pixel electrodes according to an embodiment of the present disclosure.

Optionally, as shown in FIG. 4, which illustrates a schematic flow diagram of a process of charging each row of to-be-charged pixel electrodes when charging N rows of to-be-charged pixel electrodes according to an embodiment of the present disclosure, in a process of compensating the charging voltage value corresponding to the first N rows of to-be-charged pixel electrodes in the display stage and charging the first N rows of to-be-charged pixel electrodes according to the charging voltage value after compensated, the step of charging each of the first N rows of to-be-charged pixel electrodes includes:

Step 201: according to a charging voltage value corresponding to a previous row of pixel electrodes, compensating a charging voltage value corresponding to a present row of to-be-charged pixel electrodes; and Step 202: charging the present row of to-be-charged pixel electrodes according to a charging voltage after compensation.

When a voltage of the data line is changed to a charging voltage of the present row of the pixel electrodes 3 from a charging voltage of the previous row of the pixel electrodes 3, if a difference between the charging voltage value of the previous row of the pixel electrodes 3 and the charging voltage of the present row of the pixel electrodes 3 is relatively great, a sudden change of the voltage value of the touch electrode 1 is caused. Therefore, the sudden change of the voltage value of the touch electrode 1 is related to the charging voltage of the previous row of the pixel electrodes 3, according to the charging voltage value of the previous row of the pixel electrodes 3, the charging voltage value corresponding to the present row of the pixel electrodes 3 are compensated, which can more precisely offset the influence of the sudden change of the voltage value of the touch electrode 1.

Figure 5:
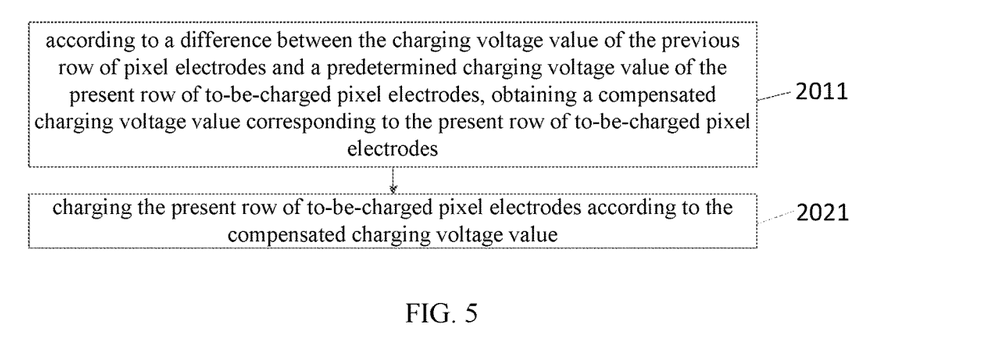
FIG. 5 illustrates another schematic flow diagram of a process of charging each row of to-be-charged pixel electrodes when charging N rows of to-be-charged pixel electrodes according to an embodiment of the present disclosure.

Optionally, as shown in FIG. 5, which illustrates another schematic flow diagram of a process of charging each row of to-be-charged pixel electrodes when charging N rows of to-be-charged pixel electrodes according to an embodiment of the present disclosure, a process of compensating the charging voltage value corresponding to the present row of to-be-charged pixel electrodes according to the charging voltage value of the previous row of pixel electrodes and charging the present row of to-be-charged pixel electrodes according to the charging voltage value after compensation includes:

Step 2011, according to a difference between the charging voltage value of the previous row of pixel electrodes and a predetermined charging voltage value of the present row of to-be-charged pixel electrodes, obtaining a compensated charging voltage value corresponding to the present row of to-be-charged pixel electrodes; and Step 2021, charging the present row of to-be-charged pixel electrodes according to the compensated charging voltage value.

When the voltage of the data line is changed to a charging voltage of the present row of pixel electrodes 3 from a charging voltage of the previous row of the pixel electrodes 3, there is a positive correlation between the difference of the charging voltage value of the previous row of pixel electrodes and the predetermined charging voltage value of the present row of to-be-charged pixel electrodes, and a sudden change extent of the voltage value of the touch electrode 1, that is to say, the greater the difference between the charging voltage value of the previous row of the pixel electrodes 3 and the predetermined charging voltage value of the present row of to-be-charged pixel electrodes 3, the greater the sudden change extent of the voltage of the touch electrode 1, and then the compensated charging voltage value is required to be greater. Thus, according to the difference between the charging voltage value of the previous row of pixel electrodes and the predetermined charging voltage value of the present row of to-be-charged pixel electrodes, the compensated charging voltage value corresponding to the present row of to-be-charged pixel electrodes is obtained, which can more precisely offset the influence of the sudden change of the voltage value of the touch electrode 1.

Figure 6:
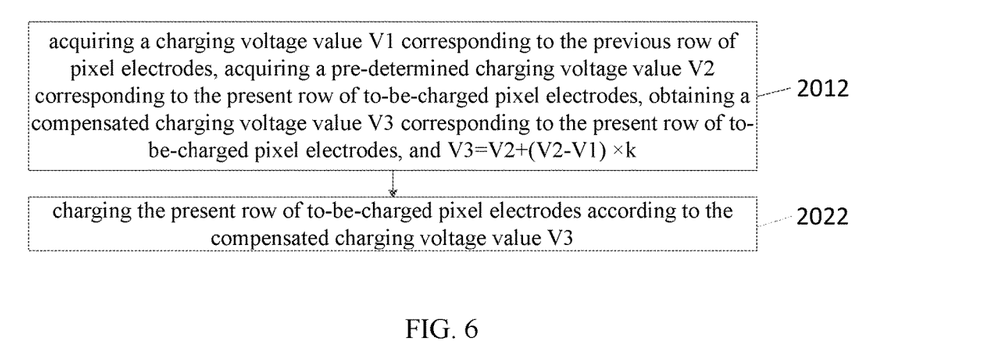
FIG. 6 illustrates still another schematic flow diagram of a process of charging each row of to-be-charged pixel electrodes when charging N rows of to-be-charged pixel electrodes according to an embodiment of the present disclosure.

Optionally, as shown in FIG. 6, which illustrates still another schematic flow diagram of a process of charging each row of to-be-charged pixel electrodes when charging N rows of to-be-charged pixel electrodes according to an embodiment of the present disclosure, a process of according to a difference between the charging voltage value of the previous row of pixel electrodes and the predetermined charging voltage value of the present row of to-be-charged pixel electrodes, obtaining a compensated charging voltage value corresponding to the present row of to-be-charged pixel electrodes, and charging the present row of to-be-charged pixel electrodes according to the compensated charging voltage value, includes:

Step 2012, acquiring a charging voltage value V1 corresponding to the previous row of pixel electrodes, acquiring a pre-determined charging voltage value V2 corresponding to the present row of to-be-charged pixel electrodes, obtaining a compensated charging voltage value V3 corresponding to the present row of to-be-charged pixel electrodes, and $V3=V2+(V2-V1)\times k$, wherein k refers to a predetermined coefficient; and Step 2022, charging the present row of to-be-charged pixel electrodes according to the compensated charging voltage value V3.

According to the above-described formula, the compensated charging voltage value is the difference between the predetermined charging voltage value V2 of the present row of to-be-charged pixel electrodes and the charging voltage value V1 of the previous row of pixel electrodes and multiplied by the coefficient k, and then plus V2, wherein V2−V1 can reflect a sudden change direction and extent of the voltage value of the touch electrode 1. Therefore, no matter an absolute value of the voltage of the data line 5 becomes greater or smaller, or a polarity of the voltage is changed or not, the compensated charging voltage can be directly obtained, which can more precisely offset the influence of the sudden change of the voltage value of the touch electrode 1.

Optionally, 0<k<1, in that range, the predetermined coefficient can be set according to specific situation, in order to make the compensated charging voltage value V3 match with the sudden change of the voltage value of the touch electrode 1.

Optionally, N=2, or N=3.

After finishing the touch stage and after entering into the display stage, when the previous few rows of the pixel electrodes 3 are charged, a sudden change extent of the voltage value of the touch electrode 1 is relatively great, with the continuation of the charging process, the sudden change extent of the voltage value of the touch electrode 1 becomes small, when the sudden change extent of the voltage value of the touch electrode 1 becomes small to a certain extent, it is possible to stop compensating the charging voltage value. For example, only the charge voltage values corresponding to the previous two rows or previous three rows of to-be-charged pixel electrodes 3 are compensated at the display stage.

Figure 7:
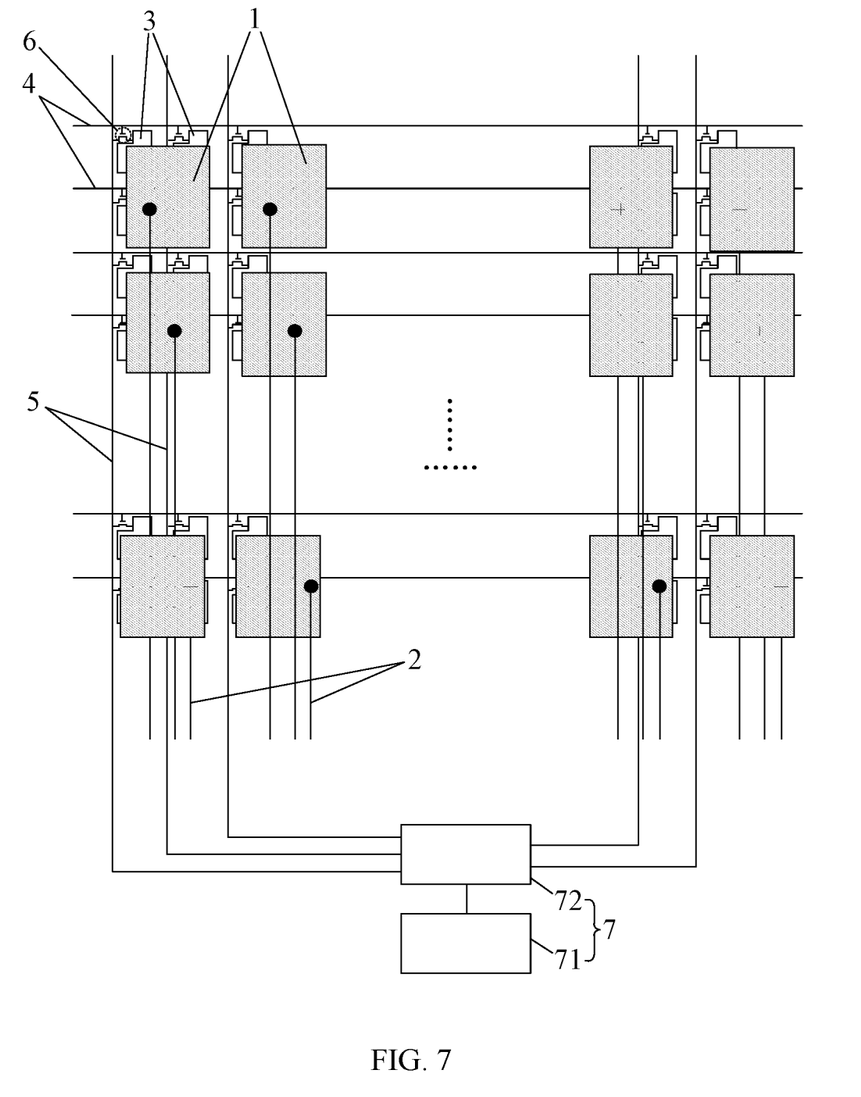
FIG. 7 illustrates a structural schematic diagram of another display panel according to an embodiment of the present disclosure.

As shown in FIG. 7, which illustrates a structural schematic diagram of another display panel according to an embodiment of the present disclosure, an embodiment of the present disclosure provides a display panel, including a drive unit 7. The drive unit 7 includes a compensation module 71 and a drive module 72. The compensation module 71 is used for compensating a charging voltage value corresponding to first N rows of to-be-charged pixel electrodes 3 when finishing a touch stage and entering into a display stage, and N is an integer greater than or equal to 1. The drive module 72 is used for charging the first N rows of the to-be-charged pixel electrodes 3 according to a charging voltage value after compensation and driving the display panel to display.

For example, the drive module 72 is electrically connected with each data line 5. The display panel can apply the method for driving a display panel in above-described embodiments, and its principle and process are the same as the above-described embodiments, which will not be repeated herein.

In the display panel of embodiments of the present disclosure, after finishing the touch stage and entering into the display stage, the charging voltage value corresponding to the first N rows of to-be-charged pixel electrodes at the display stage is compensated, the first N rows of to-be-charged pixel electrodes are charged according to the charging voltage value after compensation, the voltage value difference between the charging voltage value after compensation and the voltage value of the touch electrode after sudden change is still close to the target voltage difference. Therefore, a corresponding liquid crystal can deflect close to a predetermined angle, an adverse influence of the sudden change of the voltage value of the touch electrode on charging can be offset in a certain extent, and a risk of abnormal display caused by a sudden change of voltage on a touch electrode, when finishing a touch stage and entering into a display stage is, decreased.

Optionally, the compensation module 71 is specifically used for: compensating a charging voltage value corresponding to a present row of to-be-charge pixel electrodes, according to a charging voltage value corresponding to a previous row of pixel electrodes. The drive module 72 is specifically used for: charging the present row of to-be-charge pixel electrodes, according to a charging voltage value after compensation.

When a voltage of the data line is changed to a charging voltage of the present row of the pixel electrodes 3 from a charging voltage of the previous row of the pixel electrodes 3, if a difference between the charging voltage value of the previous row of the pixel electrodes 3 and the charging voltage of the present row of the pixel electrodes 3 is relatively great, a sudden change of the voltage value of the touch electrode 1 is caused. Therefore, the sudden change of the voltage value of the touch electrode 1 is related to the charging voltage of the previous row of the pixel electrodes 3, according to the charging voltage value of the previous row of the pixel electrodes 3, the charging voltage value corresponding to the present row of the pixel electrodes 3 is compensated, which can more precisely offset the influence of the sudden change of the voltage value of the touch electrode 1.

Optionally, the compensation module 71 is specifically used for: according to a difference between a charging voltage value corresponding to the previous row of pixel electrodes and a pre-determined charging voltage value corresponding to the present row of to-be-charged pixel electrodes, obtaining a compensated charging voltage value corresponding to the present row of to-be-charged pixel electrodes.

When the voltage of the data line is changed to a charging voltage of the present row of pixel electrodes 3 from a charging voltage of the previous row of the pixel electrodes 3, there is a positive correlation between the difference between the charging voltage value of the previous row of pixel electrodes and the predetermined charging voltage value of the present row of to-be-charged pixel electrodes, and a sudden change extent of the voltage value of the touch electrode 1, that is to say, the greater the difference between the charging voltage value of the previous row of the pixel electrodes 3 and the predetermined charging voltage value of the present row of to-be-charged pixel electrodes 3, the greater the sudden change extent of the voltage of the touch electrode 1, and then the compensated charging voltage value is required to be greater. Thus, according to the difference between the charging voltage value of the previous row of pixel electrodes and the predetermined charging voltage value of the present row of to-be-charged pixel electrodes, the compensated charging voltage value corresponding to the present row of to-be-charged pixel electrodes is obtained, which can more precisely offset the influence of the sudden change of the voltage value of the touch electrode 1.

Optionally, the compensation module 71 is specifically used for: acquiring a charging voltage value V1 corresponding to the previous row of pixel electrodes, acquiring a pre-determined charging voltage value V2 corresponding to the present row of to-be-charged pixel electrodes, and obtaining a compensated charging voltage value V3 corresponding to the present row of to-be-charged pixel electrodes, and $V3=V2+(V2-V1)\times k$.

According to the above-described formula, the compensated charging voltage value is the difference between the predetermined charging voltage value V2 of the present row of to-be-charged pixel electrodes and the charging voltage value V1 of the previous row of pixel electrodes and multiplied by the coefficient k, and then plus V2, wherein $V2-V1$ can reflect a sudden change direction and extent of the voltage value of the touch electrode 1. Therefore, no matter an absolute value of the voltage of the data line 5 becomes greater or smaller, or a polarity of the voltage is changed or not, the compensated charging voltage can be directly obtained, which can more precisely offset the influence of the sudden change of the voltage value of the touch electrode 1.

Optionally, 0<k<1, in that range, the predetermined coefficient can be set according to specific situation, in order to make the compensated charging voltage value V3 match with the sudden change of the voltage value of the touch electrode 1.

Optionally, N=2, or N=3.

After finishing the touch stage and after entering into the display stage, when the previous few rows of the pixel electrodes 3 are charged, a sudden change extent of the voltage value of the touch electrode 1 is relatively great, with the continuation of the charging process, the sudden change extent of the voltage value of the touch electrode 1 becomes small, when the sudden change extent of the voltage value of the touch electrode 1 becomes small to a certain extent, it is possible to stop compensating the charging voltage value can no longer be compensated. For example, only the charge voltage values corresponding to the previous two rows or previous three rows of to-be-charged pixel electrodes 3 are compensated at the display stage Display.

Optionally, the display panel further includes a plurality of touch electrodes 1 placed in matrix and a plurality of touch signal lines 2. Each touch electrode 1 is electrically connected with at least one touch signal line 2. At the touch stage, the touch electrodes 1 receive touch pulse signals. At the display stage, the touch electrodes 1 receive common electrode voltages.

Optionally, as shown in FIG. 3, each frame includes a plurality of touch stages (only one is shown in FIG. 3) and a plurality of display stages (only two are shown in FIG. 3). The touch stages and the display stages are alternatively placed.

Figure 8:
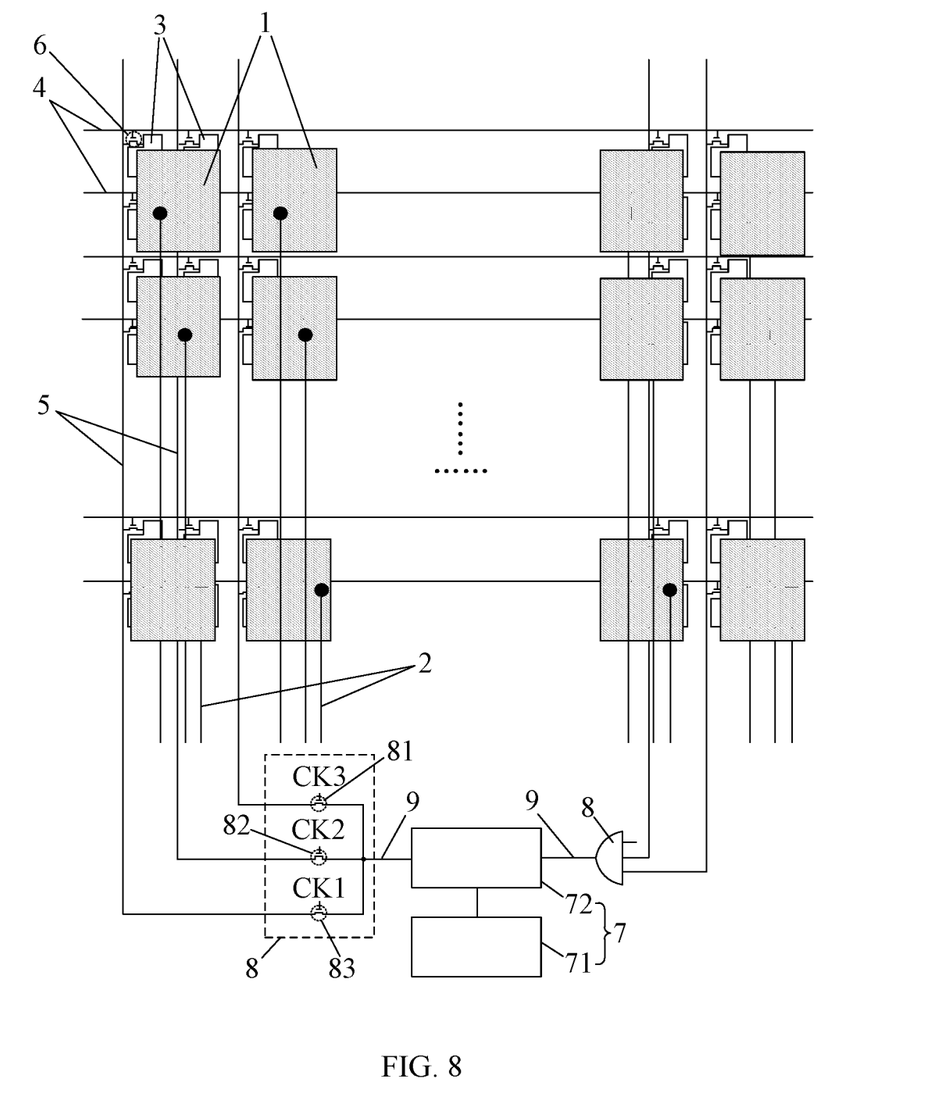
FIG. 8 illustrates a structural schematic diagram of still another display panel according to an embodiment of the present disclosure.

Optionally, the data lines 5 as shown in FIG. 7 are directly electrically connected to the drive module 72. Alternatively, the data lines can also be electrically connected to the drive module 72 by a demultiplexer. As shown in FIG. 8, illustrates a structural schematic diagram of still another display panel according to an embodiment of the present disclosure, the display panel further includes a plurality of data lines 5 and a plurality of demultiplexers 8. An output end of each demultiplexer 8 is connected with a plurality of data lines 5, and an input end of each demultiplexer 8 is connected to the drive module 72.

Figure 9:
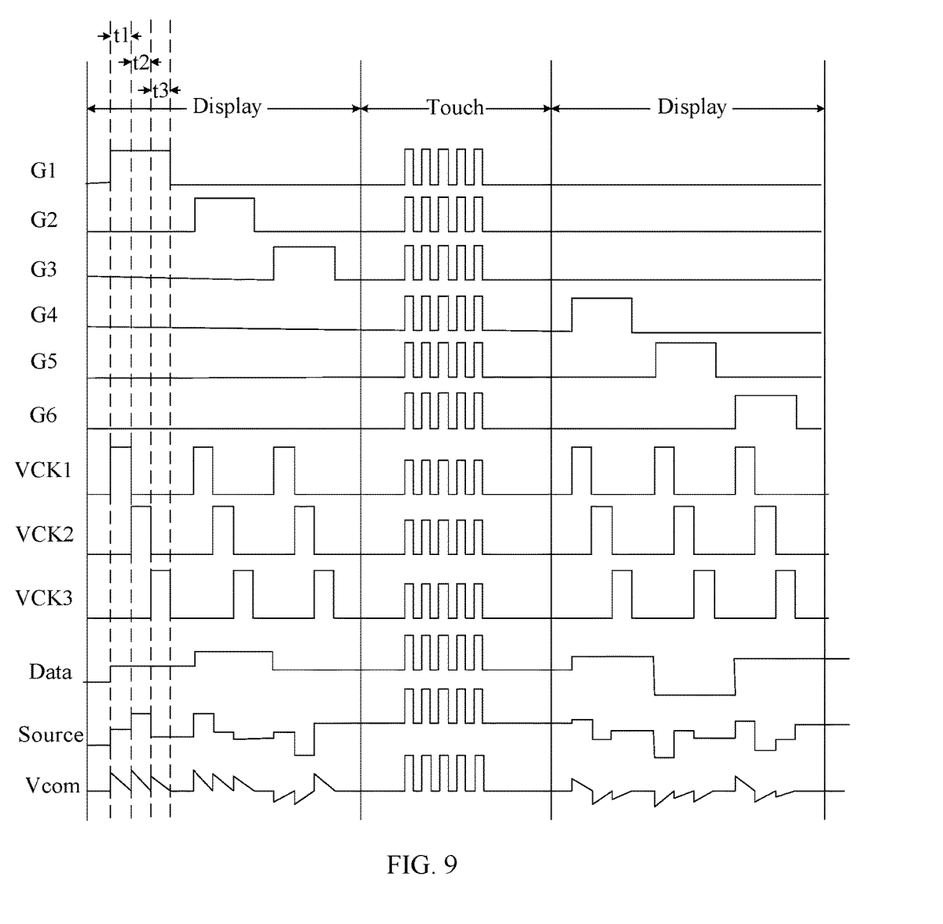
FIG. 9 illustrates a sequence diagram of the display panel in FIG. 8.

The demultiplexer 8 is used for dividing one signal line 9 into a plurality of data lines 5, that is to say, a plurality of data lines 5 are connected to the drive module 72 by one signal line 9. Each data line 5 corresponds to one column of the pixel electrodes 3. The drive unit 7 is usually integrated into a chip, and for saving quantities of pins of the chip and leads connected to the chip, the demultiplexer 8 is used to make the data lines 5 be electrically connected with the drive module 71. The demultiplexer 8 can realize the demultiplex of the signal lines under control of the clock signal. For example, the demultiplexer 8 includes a first thin film transistor 81, a second thin film transistor 82, and a third thin film transistor 83. In the demultiplexer 8, source electrodes of the thin film transistors are connected with each other to be an input end of the demultiplexer 8, and drain electrodes of the thin film transistors are used as an output end of the demultiplexer 8, respectively. A gate electrode of the first thin film transistor 81 is connected with a first clock signal end CK1, a gate electrode of the second thin film transistor 82 is connected with a second clock signal end CK2, and a gate electrode of the third thin film transistor 83 is connected with a third clock signal end CK3. A first column to a third column of sub-pixel units 3 correspond to one demultiplexer 8. The first column of sub-pixel unit 3 is a red sub-pixel unit, whose corresponding data line 5 is connected with the drain electrode of the first thin film transistor 81 in a corresponding demultiplexer 8; the second column of sub-pixel unit 3 is a green sub-pixel unit, whose corresponding data line 5 is connected with the drain electrode of the second thin film transistor 82 in a corresponding demultiplexer 8; and the third column of sub-pixel unit 3 is a blue sub-pixel unit, whose corresponding data line 5 is connected with the drain electrode of the third thin film transistor 83 in a corresponding demultiplexer 8. As shown in FIG. 9, G1, G2, G3 ... G6 respectively refer to signals on the gate lines 4 corresponding to a first row to a sixth row of the pixel electrodes 3. Data refers to a voltage signal of the data line 5 corresponding to a first row and a first column of pixel electrodes 3. Vcom refers to a voltage signal of the touch electrode 1. VCK1 refers to a voltage signal on the first clock signal end CK1, VCK2 refers to a voltage signal on the second clock signal end CK2, and VCK3 refers to a voltage signal on the third clock signal end CK3. Source refers to a voltage signal on a data line 9 corresponding to the first column to the third column of sub-pixel unit 3. A time for charging one row of the pixel electrodes 3 includes a first time period t1, a second time period t2, and a third time period t3. In the first time period t1, the first clock signal end CK1 outputs a turn-on level, to make the first thin film transistor 81 be turned on, that is to say, the first thin film transistor 81 is connected with the signal line 9 corresponding to the first column to the third column of sub-pixel units 3 and the data line 5 corresponding to the first column of sub-pixel units 3. In the second time period t2, the second clock signal end CK2 outputs a turn-on level, to make the second thin film transistor 82 be turned on, that is to say, the second thin film transistor 82 is connected with the signal line 9 corresponding to the first column to the third column of sub-pixel units 3 and the data line 5 corresponding to the second column of sub-pixel units 3. In the third time period t3, the third clock signal end CK3 outputs a turn-on level, to make the third thin film transistor 83 be turned on, that is to say, the third thin film transistor 83 is connected with the signal line 9 corresponding to the first column to the third column of sub-pixel units 3 and the data line 5 corresponding to the third column of sub-pixel units 3. The time-division multiplex of signal line 9 is realized by the demultiplexer 8, which is used to transmit the charging voltage signal corresponding to the first row and first column of sub-pixel units 3 in first time period t1, to transmit the charging voltage signal corresponding to the first row and the second column of sub-pixel units 3 in second time period t2, and to transmit the charging voltage signal corresponding to the first row and the third column of sub-pixel units 3 in the third time period t3.

Optionally, the display panel can be a liquid crystal display panel.

Figure 10:
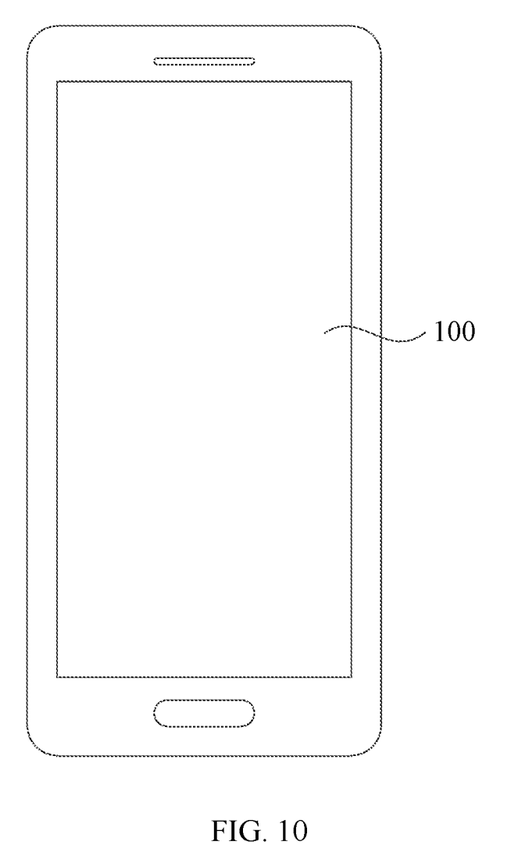
FIG. 10 illustrates a schematic diagram of a display device according to an embodiment of the present disclosure.

As shown in FIG. 10, which illustrates a schematic diagram of a display device according to an embodiment of the present disclosure, an embodiment of the present disclosure provides a display device, including the display panel 100.

In the display panel of embodiments of the present disclosure, after finishing the touch stage and entering into the display stage, the charging voltage value corresponding to the first N rows of to-be-charged pixel electrodes at the display stage is compensated, the first N rows of to-be-charged pixel electrodes are charged according to the charging voltage value after compensation, the voltage value difference between the charging voltage value after compensation and the voltage value of the touch electrode after sudden change is still close to the target voltage difference. Therefore, a corresponding liquid crystal can deflect close to a predetermined angle, an adverse influence of the sudden change of the voltage value of the touch electrode on charging can be offset in a certain extent, and a risk of abnormal display caused by a sudden change of voltage on a touch electrode, when finishing a touch stage and entering into a display stage, is decreased.

Finally, it should be noted that embodiments described above are merely to illustrate technical solutions of the present disclosure, and they do not limit the present disclosure. Although the present disclosure is described in detail with reference to the above-mentioned embodiments, it will be understood by those of ordinary skill in the art: they can still modify to the technical solution described in above-mentioned embodiments, or carry out equivalent substitution to a part or all of the technical characteristic, but these modifications or replacements will not let the essence of corresponding technical solutions be departed from the scope of the technical solution of various embodiments of the present disclosure.

What is claimed is:

1. A method for driving a display panel, the method being performed in a touch stage and a display stage, and comprising steps of:
   when finishing the touch stage and entering into the display stage, compensating N charging voltage values respectively corresponding to first N rows of to-be-charged pixel electrodes in the display stage;
   charging each row of the first N rows of to-be-charged pixel electrodes according to a corresponding charging voltage value after compensation;
   wherein N is an integer greater than or equal to 1,
   wherein the step of compensating a charging voltage value respectively corresponding to first N rows of to-be-charged pixel electrodes in the display stage and charging each row of the first N rows of to-be-charged pixel electrodes according to a corresponding charging voltage value after compensation comprises steps of:
   according to a difference between a charging voltage value corresponding to a previous row of pixel electrodes and a pre-determined charging voltage value corresponding to a present row of to-be-charged pixel electrodes, obtaining a compensated charging voltage value corresponding to the present row of to-be-charged pixel electrodes, and
   charging the present row of to-be-charged pixel electrodes according to the compensated charging voltage value,
   wherein the steps of according to the difference between the charging voltage value corresponding to the previous row of pixel electrodes and the pre-determined charging voltage value corresponding to the present row of to-be-charged pixel electrodes, obtaining the compensated charging voltage value corresponding to the present row of to-be-charged pixel electrodes, and charging the present row of to-be-charged pixel electrodes according to the compensated charging voltage value comprise:
   acquiring a charging voltage value V1 corresponding to the previous row of pixel electrodes,
   acquiring a pre-determined charging voltage value V2 corresponding to the present row of to-be-charged pixel electrodes, and
   obtaining a compensated charging voltage value V3 corresponding to the present row of to-be-charged pixel electrodes, wherein $V3=V2+(V2-V1)\times k$.

2. The method according to claim 1, wherein $0<k<1$.

3. The method according to claim 1, wherein $N=2$ or $N=3$.

4. A display panel, comprising a drive unit, wherein the drive unit comprises:
   a compensation module, configured to, when a touch stage is finished and a display stage is entered, compensate N charging voltage values respectively corresponding to first N rows of to-be-charged pixel electrodes in the display stage, N is an integer greater than or equal to 1; and
   a drive module, configured to charge each row of the first N rows of to-be-charged pixel electrodes according to a corresponding charging voltage value after compensation and drive the display panel to display,
   wherein the compensation module is further configured to compensate a charging voltage value corresponding to a present row of to-be-charge pixel electrodes, according to a charging voltage value corresponding to a previous row of pixel electrodes; and the drive module is further configured to charge the present row of to-be-charge pixel electrodes, according to a charging voltage value after compensation,
   wherein the compensating module is further configured to, according to a difference between the charging voltage value corresponding to the previous row of pixel electrodes and a pre-determined charging voltage value corresponding to the present row of to-be-charged pixel electrodes, obtaining the compensated charging voltage corresponding to the present row of to-be-charged pixel electrodes.

5. The display panel according to claim 4, wherein the compensation module is further configured to acquire a charging voltage value V1 corresponding to the previous row of pixel electrodes, acquire a pre-determined charging voltage value V2 corresponding to the present row of to-be-charged pixel electrodes, and obtain a compensated charging voltage value V3 corresponding to the present row of to-be-charged pixel electrodes, and $V3=V2+(V2-V1)\times k$.

6. The display panel according to claim 5, wherein $0<k<1$.

7. The display panel according to claim 4, wherein $N=2$ or $N=3$.

8. The display panel according to claim 4, further comprising:
   a plurality of touch electrodes placed in a matrix; and
   a plurality of touch signal lines;
   wherein each of the plurality of touch electrodes is connected with at least one of the plurality of touch signal lines; and in the touch stage, the plurality of touch electrodes is configured to receive a touch pulse signal, and in the display stage, the plurality of touch electrodes is configured to receive a common electrode voltage.

9. The display panel according to claim 8, wherein each frame comprises a plurality of touch stages and a plurality of display stages, the touch stages and the display stages are alternatively set.

10. The display panel according to claim 4, further comprising:
    a plurality of data lines; and
    a plurality of demultiplexers;
    wherein an output end of each of the plurality of demultiplexers is connected with more than one of the data lines, and an input end of each of the plurality of demultiplexers is connected with the drive module.

11. The display panel of claim 4, wherein the display panel is a liquid crystal display panel.

12. A display device, comprising a display panel, wherein the display panel comprises:
- a drive unit, wherein the drive unit comprises:
- a compensation module, configured to, when a touch stage is finished and a display stage is entered, compensate N charging voltage values respectively corresponding to first N rows of to-be-charged pixel electrodes in the display stage, N is an integer greater than or equal to 1; and
- a drive module, configured to charge each row of the first N rows of to-be-charged pixel electrodes according to a corresponding charging voltage value after compensation and drive the display panel to display,
- wherein the compensation module is further configured to compensate a charging voltage value corresponding to a present row of to-be-charge pixel electrodes, according to a charging voltage value corresponding to a previous row of pixel electrodes; and the drive module is further configured to charge the present row of to-be-charge pixel electrodes, according to a charging voltage value after compensation,
- wherein the compensating module is further configured to, according to a difference between the charging voltage value corresponding to the previous row of pixel electrodes and a pre-determined charging voltage value corresponding to the present row of to-be-charged pixel electrodes, obtaining the compensated charging voltage corresponding to the present row of to-be-charged pixel electrodes.

\* \* \* \* \*